Feb. 13, 1934.  L. A. ROGGENSACK  1,946,501
MEANS FOR OVERCOMING SIDE DRAFT
Filed Aug. 6, 1932  2 Sheets-Sheet 1
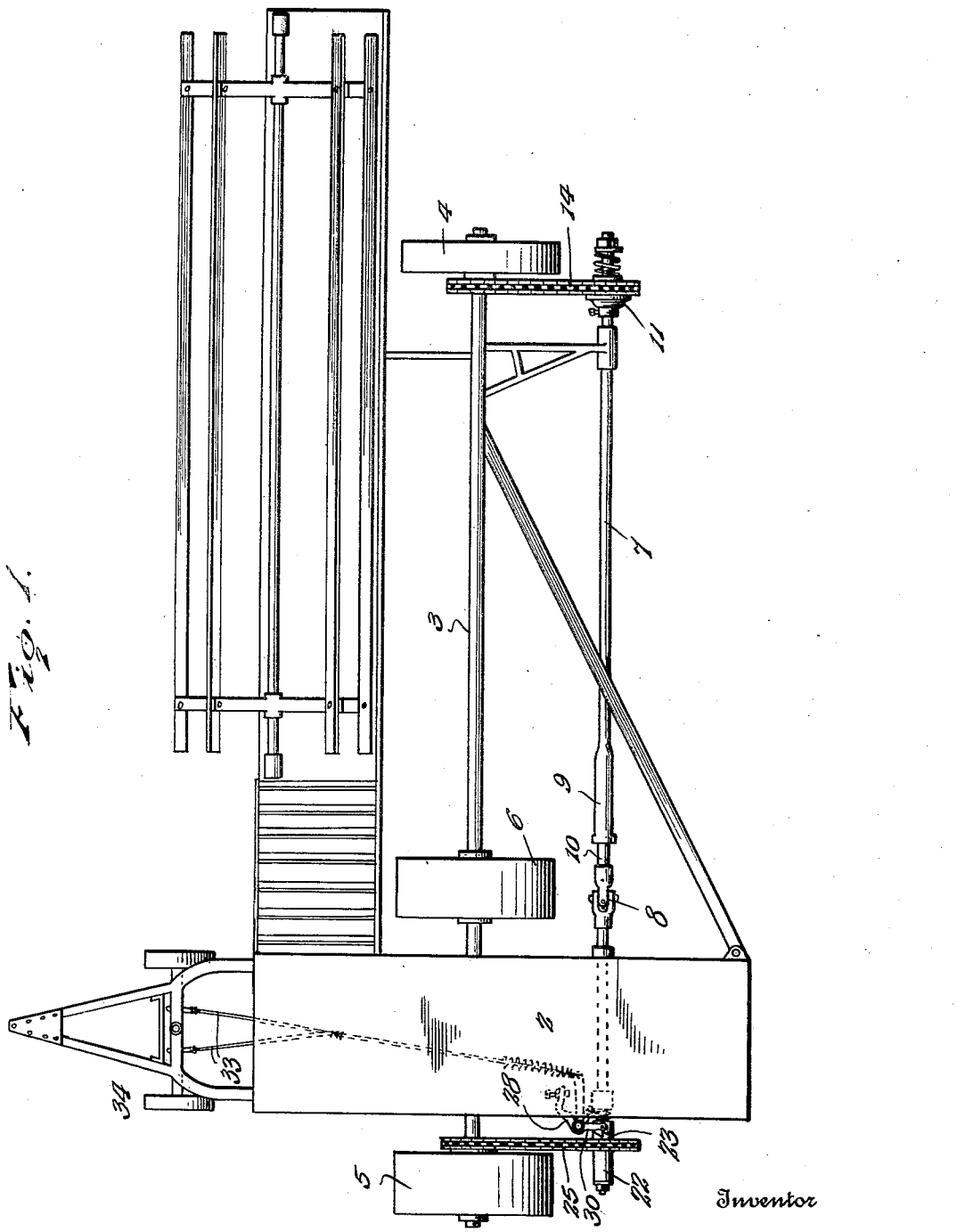

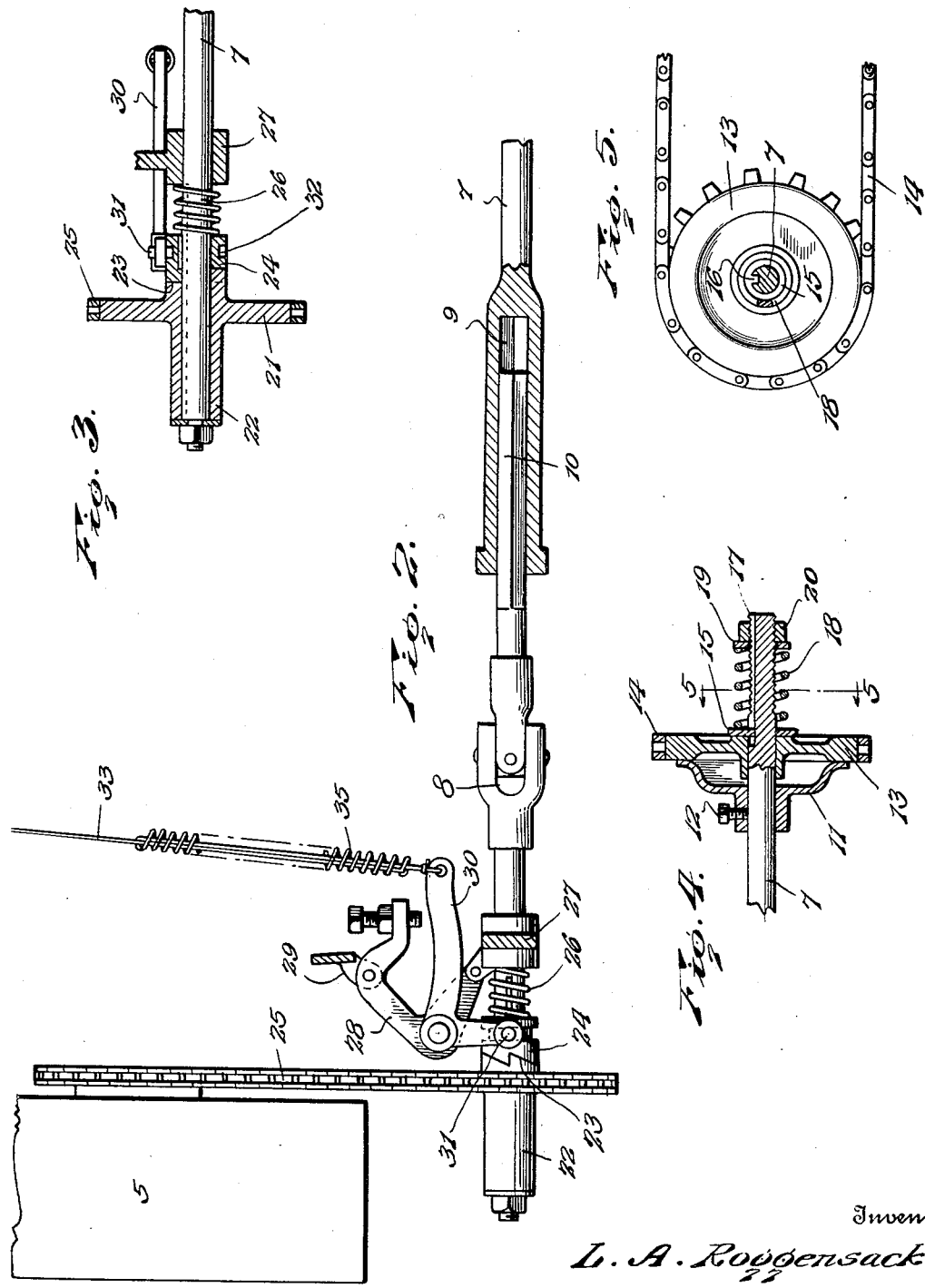

Patented Feb. 13, 1934

1,946,501

UNITED STATES PATENT OFFICE 1,946,501

MEANS FOR OVERCOMING SIDE DRAFT

Lutie A. Roggensack, Moorhead, Minn.

Application August 6, 1932. Serial No. 627,772

3 Claims. (Cl. 56—321)

The object of this invention is to provide means whereby the side draft in agricultural machines may be eliminated and it is designed more particularly for combined harvesters and threshers. The invention is illustrated in the accompanying drawings and consists in certain novel features which will be hereinafter first fully described and then more particularly defined in the appended claims.

In the drawings, Fig. 1 is a plan view of a combine showing the application of the invention thereto, Fig. 2 is a similar view on a larger scale of one end portion of the device constituting the invention, Fig. 3 is an enlarged longitudinal section through the shaft of the device, Fig. 4 is a similar view taken at the opposite end of the shaft, Fig. 5 is an elevation, with a part in section, on the line 5—5 of Fig. 4.

The combine may be of any preferred construction and is illustrated at 1 in a conventional manner, the same including a grain separator 2 which extends rearwardly from the front of the machine at one end thereof. A main shaft or axle 3 extends from side to side of the machine and is equipped with ground wheels 4 and 5 and an intermediate wheel 6, as will be understood.

In carrying out the present invention, there is provided a rear shaft 7 which, as shown most clearly in Fig. 2, is composed of two sections having a telescopic connection and equipped with a universal joint 8 whereby the shaft may readily accommodate itself to unevennesses in the field over which the machine is drawn and may be readily extended or contracted so as to be mounted upon machines of various sizes. The socket member 9 of one shaft section is provided with a bore of non-circular cross section and the tenon member 10 has a corresponding cross section whereby it may slide in the socket but will be forced to rotate therewith. At one end of the shaft 7, a friction clutch disk 11 is secured thereto by a set bolt 12 and at the outer side of said disk a sprocket wheel 13 is loosely fitted upon the shaft and is held normally in engagement with the disk 11 so that said elements will rotate together. A sprocket chain 14 is trained about the sprocket 13 and about a similar sprocket which is connected with the side of the ground wheel 4, as will be understood. A washer 15 is fitted loosely upon the shaft 7 at the outer side of the sprocket 13 and is formed with a tooth or lug 16 which engages in a longitudinal groove 17 in the shaft so that while the washer may slide upon the shaft it will be constrained to rotate therewith. An expansion spring 18 is coiled about the shaft between the washer 15 and an outer washer 19 which is loose upon the shaft and is held in adjusted position by a nut 20 threaded on the end of the shaft, as shown in Fig. 4.

At the opposite end of the shaft 7 a sprocket wheel 21 is loosely mounted upon the shaft and the hub 22 of said wheel is provided with a clutch face 23 at its inner side mating with a clutch collar 24 which is slidably mounted on the shaft and is constrained to rotate therewith. A sprocket chain 25 is trained about the sprocket 21 and a similar sprocket connected to the side of the ground wheel 5 so that the sprocket 21 will rotate with the ground wheel. An expansion spring 26 is disposed about the shaft between the clutch collar 24 and the bearing 27 in which the shaft is journaled and yieldably holds the clutch hub and clutch collar in operative engagement. The bearing 27 is carried by a bracket 28 which is secured to some fixed part of the combine, as, for instance, a bracket 29 which is secured rigidly on the bottom of the separator 2. An angle lever 30 is fulcrumed upon the bracket 28 and has one arm equipped with a stud 31 engaged in an annular groove 32 in the circumference of the clutch collar 24 whereby, when the lever is rocked, the clutch collar may be released from the clutch hub. The other arm of the angle lever extends inwardly and projects under the combine, as will be understood upon reference to Figs. 1 and 2, and a cable 33 is attached to the free end of the lever and extends forwardly to the axle of the front truck 34 of the combine. As shown in Fig. 1, the forward portion of the cable may be forked or branched so that it may be attached to the axle of the truck at opposite sides of the king bolt, and, if desired, a retractile spring 35 may be interposed in the length of the cable to maintain the proper tension thereon.

It will be readily noted that when the machine is drawn over a field, the ground wheels 4 and 5 will rotate through their tractive engagement with the ground and they will be held to the same speed through their connections with the shaft 7. Should either ground wheel tend to rotate faster than the other ground wheel, the sprocket 13 will slip upon the friction disk 11 until the abnormal condition has passed, the spring 18 permitting such disengagement, as will be understood. The spring 26 will hold the clutch collar and the clutch hub in operative engagement so that the rotation of the ground wheel 5 will be transmitted to the shaft 7 but, as has been stated, any acceleration of the wheel 4 will be accommodated by the temporary disengagement of the clutch disk and the sprocket 13. When the machine is to be driven around a corner or make a turn in the field, the swinging of the axle of the front steering truck will cause a pull to be exerted upon the cable 33 which will rock the angle lever 30 and shift the clutch collar 24 out of engagement with the clutch hub 23 and, consequently, the ground-engaging wheels will be permitted to describe arcs of different radii without creating side draft upon the machine.

The device is exceedingly simple and may be readily applied to any machine now in use.

Having thus described the invention, I claim:

1. An attachment for agricultural machines comprising a shaft, means for mounting said shaft at the rear of the machine, an axle, ground wheels on the axle, means for operatively connecting said shaft with one of the ground wheels whereby the shaft will be positively driven from said ground wheel, a sprocket wheel loose on the shaft, a friction device engaging the sprocket wheel, and means forming a connection between the sprocket wheel and another ground wheel.

2. An attachment for agricultural machines comprising a shaft, means for mounting said shaft at the rear of the machine parallel with the axle of the machine, ground wheels mounted on the axle, a sprocket on one end of the shaft, means for operatively connecting said sprocket with one of the ground wheels, a friction disk secured upon the shaft, yieldable means for holding said disk in engagement with the sprocket, and means at the opposite end of the shaft for operatively connecting it with another ground wheel whereby to positively rotate the shaft.

3. An attachment for agricultural machines comprising a shaft, means for mounting said shaft at the rear of the machine, an axle including ground wheels, means at one end of the shaft for releasably connecting it with one of the ground wheels, a sprocket loosely mounted upon the opposite end of the shaft, means for operatively connecting said sprocket with another ground wheel of the machine, said sprocket having a clutch hub on its inner side, a clutch collar slidably mounted on the shaft and constrained to rotate therewith and arranged to engage said clutch hub, yieldable means for holding the clutch collar and clutch hub in engagement, a lever mounted upon the machine and engaged with said clutch collar, and cable connections between said clutch lever and the steering elements of the agricultural machine.

LUTIE A. ROGGENSACK. [L. S.]